(12) United States Patent
Tong

(10) Patent No.: US 10,348,173 B2
(45) Date of Patent: Jul. 9, 2019

(54) SYNCHRONOUS RELUCTANCE MOTOR

(71) Applicant: JTEKT CORPORATION, Osaka-shi, Osaka (JP)

(72) Inventor: Mingyu Tong, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 212 days.

(21) Appl. No.: 15/292,286

(22) Filed: Oct. 13, 2016

(65) Prior Publication Data

US 2017/0110943 A1 Apr. 20, 2017

(30) Foreign Application Priority Data

Oct. 20, 2015 (JP) ................................. 2015-206204

(51) Int. Cl.
*H02K 1/24* (2006.01)
*H02K 19/02* (2006.01)
*H02K 1/22* (2006.01)

(52) U.S. Cl.
CPC ............... *H02K 19/02* (2013.01); *H02K 1/22* (2013.01); *H02K 1/246* (2013.01); *H02K 2213/03* (2013.01)

(58) Field of Classification Search
CPC ............ H02K 1/22; H02K 1/24; H02K 1/246; H02K 1/30; H02K 19/02; H02K 19/10
See application file for complete search history.

(56) References Cited

U.S. PATENT DOCUMENTS

| 4,888,513 A * | 12/1989 | Fratta | H02K 1/246 310/216.017 |
| 5,903,080 A | 5/1999 | Nashiki et al. | |
| 6,259,181 B1 * | 7/2001 | Kawano | H02K 1/246 310/162 |
| 6,675,460 B2 * | 1/2004 | Reiter, Jr. | B22F 7/06 148/514 |

(Continued)

FOREIGN PATENT DOCUMENTS

| JP | H11-289730 A | 10/1999 |
| JP | 2002-078251 A | 3/2002 |

(Continued)

OTHER PUBLICATIONS

Mar. 8, 2017 Extended European Search Report issued in Patent Application No. EP16194033.3.

*Primary Examiner* — Tran N Nguyen
(74) *Attorney, Agent, or Firm* — Oliff PLC

(57) ABSTRACT

A rotor has flux barrier groups. The number of flux barrier groups corresponds to the number of poles, and each of the flux barrier groups has a plurality of arc-shaped flux barriers. The plurality of flux barriers of each flux barrier group include arc-shaped portions formed in a polygonal region that is surrounded by a polygon having vertices at the midpoints in the circumferential direction of the flux barrier groups which are located on the outer peripheral edge of the rotor, as viewed in plan in the direction along a rotor shaft of the rotor. The center of the arcs of the arc-shaped portions of each flux barrier group is located at the midpoint in the circumferential direction of that flux barrier group which is located on the outer peripheral edge of the rotor.

4 Claims, 5 Drawing Sheets

(56) References Cited

U.S. PATENT DOCUMENTS

| | | | |
|---|---|---|---|
| 6,713,923 B2* | 3/2004 | Hino | H02K 15/03 |
| | | | 310/156.38 |
| 6,849,983 B2* | 2/2005 | Tajima | H02K 1/246 |
| | | | 310/156.53 |
| 2003/0020351 A1* | 1/2003 | Lee | H02K 1/246 |
| | | | 310/156.53 |

FOREIGN PATENT DOCUMENTS

| | | |
|---|---|---|
| JP | 2009-044791 A | 2/2009 |
| JP | 2009-247095 A | 10/2009 |
| JP | 2009-247096 A | 10/2009 |
| JP | 2011-193627 A | 9/2011 |

* cited by examiner

SYNCHRONOUS RELUCTANCE MOTOR

INCORPORATION BY REFERENCE

The disclosure of Japanese Patent Application No. 2015-206204 filed on Oct. 20, 2015 including the specification, drawings and abstract, is incorporated herein by reference in its entirety.

BACKGROUND OF THE INVENTION

1. Field of the Invention

The present invention relates to synchronous reluctance motors that are used for, e.g., electric power steering systems.

2. Description of the Related Art

Reluctance motors are known which rotate a rotor by using only reluctance torque generated by a change in electromagnetic energy with respect to the position. The reluctance motors include switched reluctance motors (SRMs) and synchronous reluctance motors (SynRMs). In the switched reluctance motors, a stator and a motor have a magnetic saliency. In the synchronous reluctance motors, a stator has a structure similar to that of a stator of a brushless motor.

In the synchronous reluctance motors, only the rotor has a magnetic saliency out of the stator and the rotor. In the synchronous reluctance motors, there are a salient direction in which magnetic flux tends to flow (hereinafter referred to as the "d-axis direction") and a non-salient direction in which the magnetic flux is less likely to flow (hereinafter referred to as the "q-axis direction") due to the magnetic saliency of the rotor. Accordingly, reluctance torque is generated due to the difference between inductance in the d-axis direction (hereinafter referred to as the "d-axis inductance") and inductance in the q-axis direction (hereinafter referred to as the "q-axis inductance"), and the rotor is rotated by the reluctance torque.

The synchronous reluctance motors do not use permanent magnets and rotate the rotor by using only the reluctance torque. The synchronous reluctance motors are therefore disadvantageous in that their output torque is smaller than that of motors using permanent magnets. It is desired to increase the output torque of the synchronous reluctance motors as much as possible.

SUMMARY OF THE INVENTION

It is one object of the present invention to provide a synchronous reluctance motor that can generate larger output torque.

According to one aspect of the present invention, a synchronous reluctance motor includes: a stator; and a rotor. The rotor has flux barrier groups formed at an interval in a circumferential direction. The number of flux barrier groups corresponds to the number of poles, and each of the flux barrier groups has a plurality of arc-shaped flux barriers that are arranged in a plurality of layers from an outer periphery of the rotor toward a center of the rotor and that are convex toward the center of the rotor. The plurality of flux barriers of each of the flux barrier groups include arc-shaped portions formed in a polygonal region that is surrounded by a polygon having vertices at midpoints in the circumferential direction of each of the flux barrier groups which are located on an outer peripheral edge of the rotor, as viewed in plan in a direction along a rotary shaft of the rotor. A center of arcs of the arc-shaped portions of each of the flux barrier groups is located at the midpoint in the circumferential direction of that flux barrier group which is located on the outer peripheral edge of the rotor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
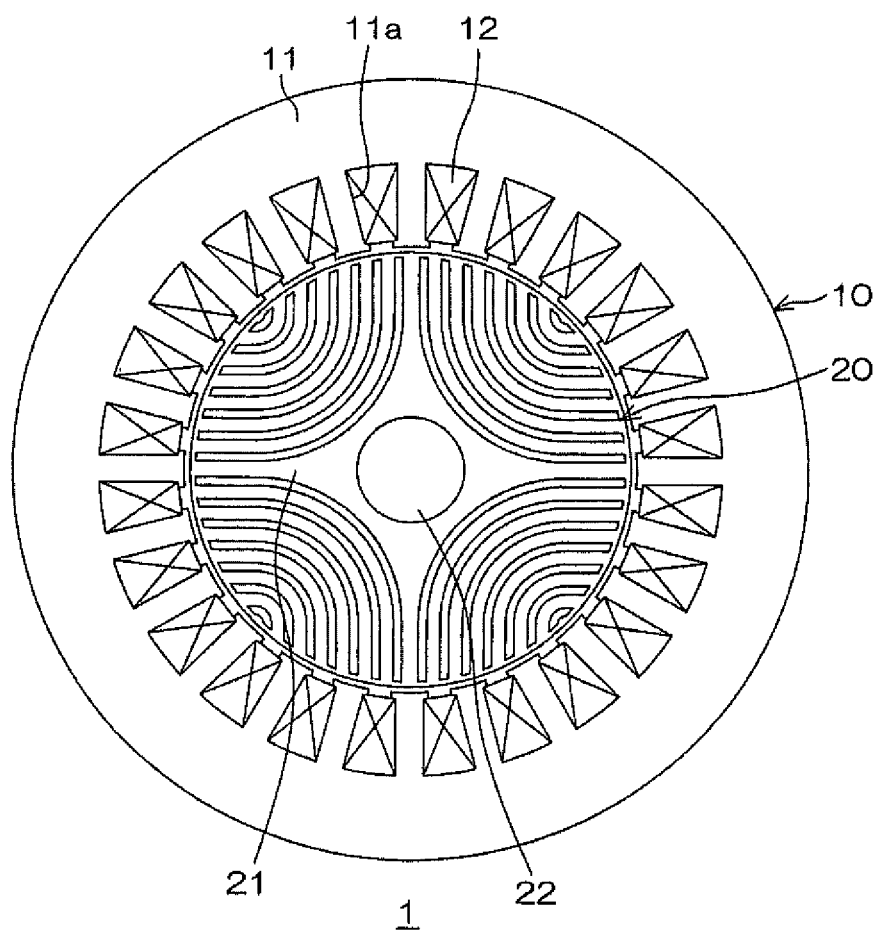
FIG. 1 is a sectional view showing the configuration of a synchronous reluctance motor according to an embodiment of the present invention.
Figure 2:
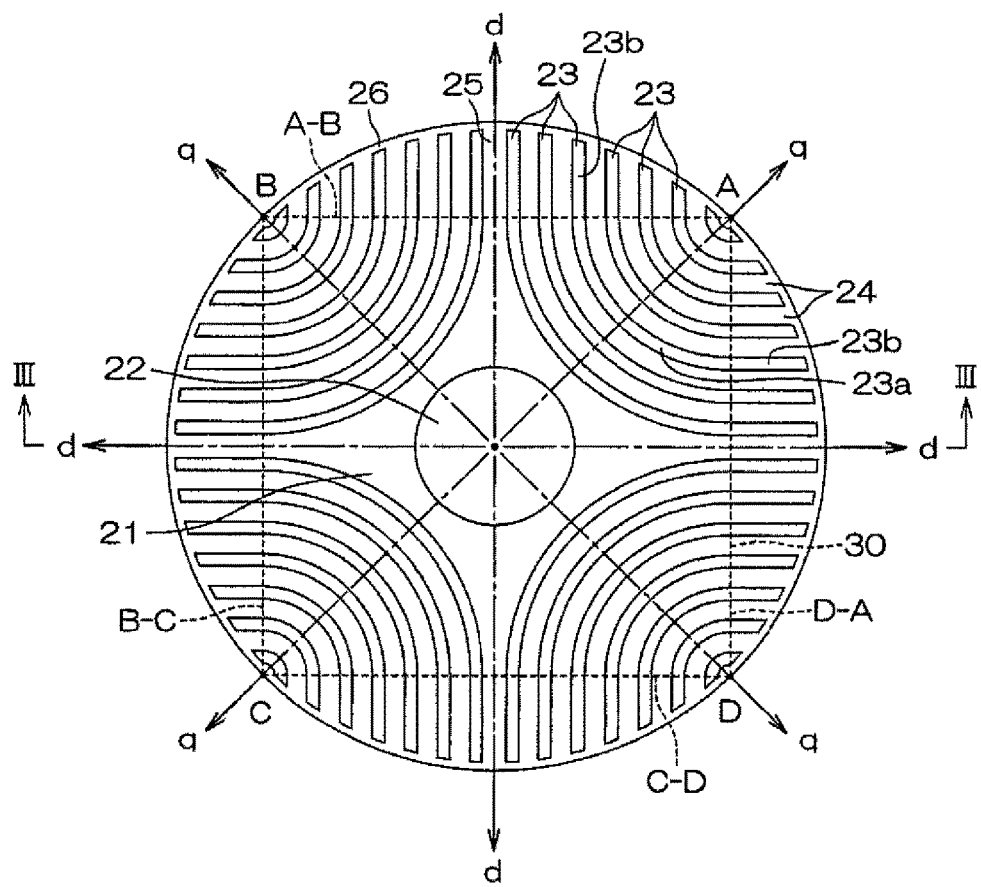
FIG. 2 is an enlarged plan view of a rotor of the synchronous reluctance motor shown in FIG. 1.
Figure 3:
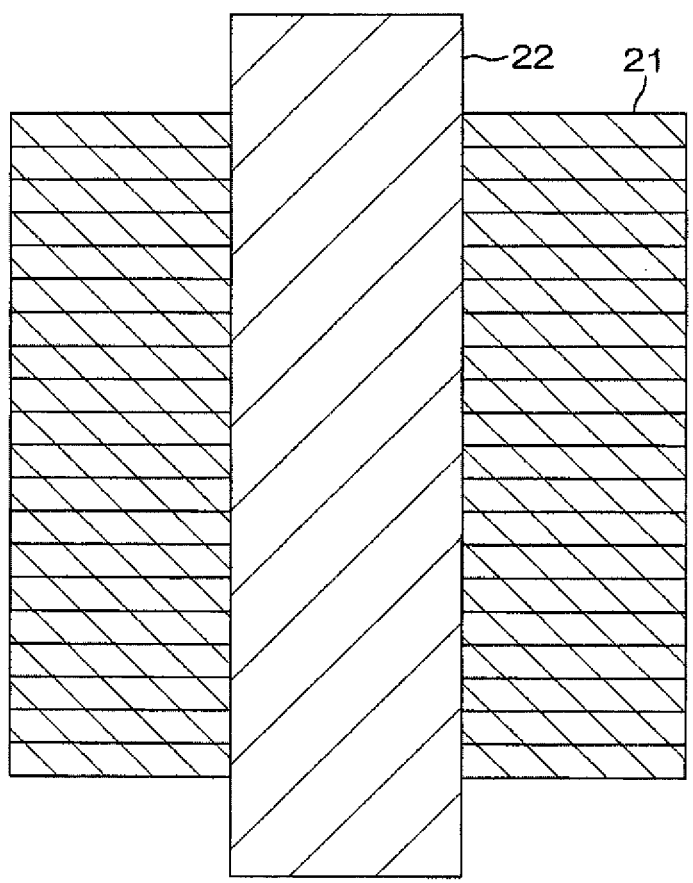
FIG. 3 is a sectional view taken along line III-III in FIG. 2.
Figure 4:
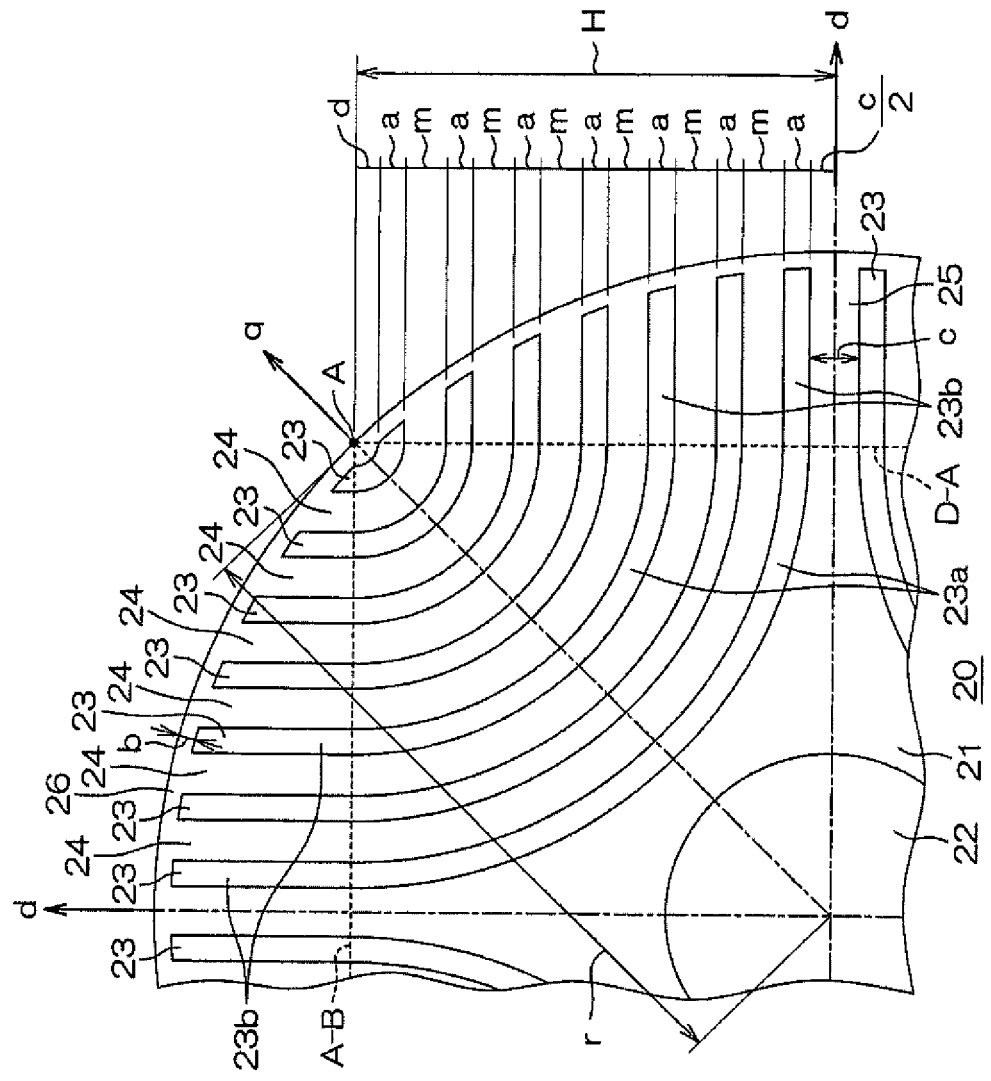
FIG. 4 is a partial enlarged plan view mainly showing the details of one flux barrier group.

An embodiment of the present invention will be described in detail below with reference to the accompanying drawings. FIG. 1 is a sectional view showing the configuration of a synchronous reluctance motor according to an embodiment of the present invention. FIG. 2 is an enlarged plan view of a rotor of the synchronous reluctance motor of FIG. 1. FIG. 3 is a sectional view taken along line III-III in FIG. 2. FIG. 4 is a partial enlarged plan view mainly showing the details of one flux barrier group.

Referring to FIG. 1, a synchronous reluctance motor 1 (hereinafter simply referred to as the "motor 1") includes a stator 10 and a rotor 20. The stator 10 generates a rotating magnetic field. The rotor 20 is disposed inside the stator 10 and is rotated by the rotating magnetic field. The stator 10 includes an annular stator core 11 and a stator coil 12. The stator core 11 is formed by stacking a plurality of annular steel sheets. The stator core 11 has a plurality of slots 11a in its inner peripheral portion so that the stator coil 12 is inserted therein. In the present embodiment, three independent stator coils 12 are wound in the stator core 11, and the number of slots 11a is 24.

Referring to FIGS. 1 to 4, the rotor 20 has four poles (two pairs of poles) in the present embodiment. The rotor 20 includes a rotor core 21 and a rotor shaft (rotary shaft) 22. The rotor shaft 22 extends through the center of the rotor core 21 and is fixed to the rotor core 21. The rotor core 21 is formed by stacking a plurality of circular electrical steel sheets each having a hole in its center. The rotor core 21 has flux barrier groups formed at intervals in the circumferential direction. The number of flux barrier groups corresponds to the number of poles. Each of the flux barrier groups has a plurality of arc-shaped flux barriers (in this example, slits (air layers)) 23 that are arranged in a plurality of layers from the outer periphery of the rotor core 21 toward the rotor shaft 22 and that are convex toward the rotor shaft 22. In this example, the rotor core 21 has four flux barrier groups formed at intervals in the circumferential direction. The flux barriers 23 of each flux barrier group are arranged in seven layers. That is, each flux barrier group has seven flux barriers 23 having different lengths. The flux barriers need not necessarily be slits, and may be made of a nonmagnetic material such as resin.

Referring to FIGS. 2 and 4, a rib 24 is a region of the rotor core 21 which is interposed between adjoining ones of the flux barriers 23 of the same flux barrier group as viewed in plan in the direction along the rotor shaft 22. A connection portion 25 is a part located close to the outer periphery of the rotor core 21 out of a region of the rotor core 21 which is interposed between adjoining ones of the flux barrier groups. A bridge 26 is an annular region of the outer peripheral portion of the rotor core 21 which includes those parts located between the outer peripheral edge of the rotor core 21 and the ends of the flux barriers 23.

The q-axis is an axis extending through centers in the circumferential direction of the flux barriers 23 of each flux barrier group in the radial direction of the rotor core 21. The d-axis is an axis extending between adjoining ones of the flux barrier groups in the radial direction of the rotor core 21. The flux barriers 23 impede the flow of magnetic flux. The magnetic flux from the stator core 11 is less likely to flow in the direction from one of adjoining two of q-axes to the other. However, due to the ribs 24 between the flux barriers 23, the magnetic flux from the stator core 11 tends to flow in the direction from one of adjoining two of d-axes to the other.

If the rotating magnetic field is applied from the stator 10 to the rotor 20, reluctance torque T is generated from the motor 1. The reluctance torque T is given by the following expression (1), $$T = Pn \cdot (Ld - Lq) \cdot Id \cdot Iq \qquad (1)$$

where "Pn" represents the number of pole pairs, "Ld" represents d-axis inductance, "Lq" represents q-axis inductance, "Id" represents a d-axis current, and "Iq" represents a q-axis current.

The reluctance torque (output torque) T therefore increases as the difference between the d-axis inductance Ld and the q-axis inductance Lq (Ld-Lq) increases. In the present embodiment, in order to increase the difference (Ld-Lq), the flux barriers 23 are formed to increase the magnetic resistance of a magnetic path in the q-axis direction and to reduce the magnetic resistance of a magnetic path in the d-axis direction. In the present embodiment, in order to increase the reluctance torque T (motor output) while reducing torque ripple, the flux barriers 23 are designed to have an appropriate shape as viewed in plan and so that the ratio of the width of the rib 24 to the width of the flux barrier 23 is an appropriate value. This will be described in detail below.

First, the shape of the flux barriers 23 as viewed in plan will be described with reference to FIGS. 2 and 4. A, B, C, and D refer to the midpoints in the circumferential direction of the flux barrier groups which are located on the outer peripheral edge of the rotor 20. A polygonal region (in this example, a quadrilateral region) 30 is a region of the rotor 20 which is surrounded by a polygon having vertices A, B, C, D as viewed in plan. The side or the line segment connecting the vertices A, B of the polygonal region 30 is sometimes referred to as "A-B," the side or the line segment connecting the vertices B, C of the polygonal region 30 is sometimes referred to as "B-C," the side or the line segment connecting the vertices C, D of the polygonal region 30 is sometimes referred to as "C-D," and the side or the line segment connecting the vertices D, A of the polygonal region 30 is sometimes referred to as "D-A."

The plurality of flux barriers 23 of each flux barrier group are formed by arc-shaped portions 23a in the polygonal region 30 and linear portions 23b as viewed in plan. The linear portions 23b extend outside the polygonal region 30 from both ends of each arc-shaped portion 23a. The center of the arcs of the plurality of arc-shaped portions 23a of each flux barrier group is located at the midpoint A, B, C, D in the circumferential direction of that flux barrier group which is located on the outer peripheral edge of the rotor 20. The linear portion 23b extending from each end of the arc-shaped portion 23a extends in the direction perpendicular to one of the four sides of the polygonal region 30 which is located close to the corresponding end of the arc-shaped portion 23a as viewed in plan. In other words, the linear portion 23b extending from each end of the arc-shaped portion 23a extends in the direction tangential to the arc-shaped portion 23a from that end of the arc-shaped portion 23a.

For example, the plurality of flux barriers 23 of one flux barrier group mainly shown in FIG. 4 are formed by a plurality of arc-shaped portions 23a and a plurality of linear portions 23b as viewed in plan. The center of the arc-shaped portions 23a is located at the point A. The linear portions 23b extend perpendicularly to the side A-B from one end on the side A-B of each arc-shaped portion 23a and extend perpendicularly to the side D-A from the other end on the side D-A of each arc-shaped portion 23a.

The reason why the plurality of flux barriers 23 of each flux barrier group are designed to have the shape described above as viewed in plan will be described below. One flux barrier group mainly shown in FIG. 4 will be described as an example. In the case where a planar circuit having an area S is placed in a magnetic field with magnetic flux density B [wb], magnetic flux Φ passing through the planar circuit having the area S is generally given by the following expression (2).

$$\Phi = BS \sin \theta \qquad (2)$$

where "θ" represents an angle between the plane of the planar circuit and the direction of the magnetic flux.

This expression (2) shows that the maximum flux Φ is maximum when the angle θ between the plane of the planar circuit and the direction of the magnetic flux is 90 degrees. The plurality of flux barriers 23 of the flux barrier group mainly shown in FIG. 4 are designed to have the shape described above as viewed in plan. The magnetic flux flowing in the d-axis direction flows perpendicularly to the sections of the ribs 24 taken along the line segment D-A, and the sectional area of each rib 24 taken along the line segment D-A is maximum. The magnetic flux utilization rate is thus improved, whereby the output torque T can be increased.

The arc-shaped portions 23a can be formed to a position closer to the center of the rotor 20 as compared to the case where the center of the arcs of the flux barriers 23 is located at a position outside the outer peripheral edge of the rotor 20 on the q-axis. The width of the ribs 24 can thus be increased, whereby the magnetic resistance of the magnetic path in the d-axis direction can be reduced. The output torque T can thus be increased.

The ratio of the width of the rib 24 to the width of the flux barrier 23 will be described. As shown in FIG. 4, "a" [mm] represents the width of the flux barrier 23, "m" [mm] represents the width of the rib 24, "b" [mm] represents the width of the bridge 26, "c" [mm] represents the width of the connection portion 25, and "d" [mm] represents the segment from the point A to the flux barrier 23 located closest to the point A on the line segment D-A. H=r/2$^{1/2}$ is satisfied, where "H" [mm] represents the distance along the line segment D-A from the point A to the middle point of the line segment D-A, and "r" [mm] represents the radius of the rotor 20.

The following expression (3) is satisfied based on FIG. 4.

$$d+7a+6m+c/2=H \quad (3)$$

It is preferable that "b" be 0.5 mm or less, that "d" be $2^{1/2} \cdot b$ or more, and that "c" be 0.5 mm or more and 2 mm or less. For example, in the present embodiment, "r," "c," "d," "m," and "a" are set to the following values. r=24.8 mm, c=2 mm, b=0.5 mm, d=$2^{1/2} \cdot b$, m=1.7 mm, and a=0.8 mm.

Table 1 shows the simulation results of the output torque and the torque ripple for various widths m of the rib 24 in the case where the sum of the width m of the rib 24 and the width a of the flux barrier 23 is constant. In this example, the sum of the width m of the rib 24 and the width a of the flux barrier 23 is from 2.2 mm to 2.5 mm. Table 1 also shows widths a of the flux barriers 23 corresponding to various widths m of the rib 24, and the values of the ratio m/a of the width m of the rib 24 to the width a of the flux barrier 23 for the various widths m of the rib 24,

TABLE 1

| Rib Width m [mm] | Slit Width a [mm] | m/a | Torque [Nm] | Torque Ripple [%] |
|---|---|---|---|---|
| 0.8 | 1.7 | 0.47 | 3.30 | 34.0 |
| 0.9 | 1.6 | 0.56 | 3.58 | 31.5 |
| 1 | 1.5 | 0.67 | 3.82 | 28.5 |
| 1.1 | 1.4 | 0.79 | 4.05 | 23.5 |
| 1.25 | 1.25 | 1.00 | 4.32 | 17.1 |
| 1.3 | 1.2 | 1.08 | 4.40 | 15.6 |
| 1.4 | 1.1 | 1.27 | 4.50 | 12.3 |
| 1.5 | 1 | 1.50 | 4.59 | 9.30 |
| 1.7 | 0.8 | 2.13 | 4.59 | 6.50 |
| 1.8 | 0.6 | 3.00 | 4.52 | 8.40 |
| 1.9 | 0.4 | 4.75 | 4.41 | 10.1 |
| 2 | 0.2 | 10.00 | 4.23 | 12.1 |

Figure 5A:
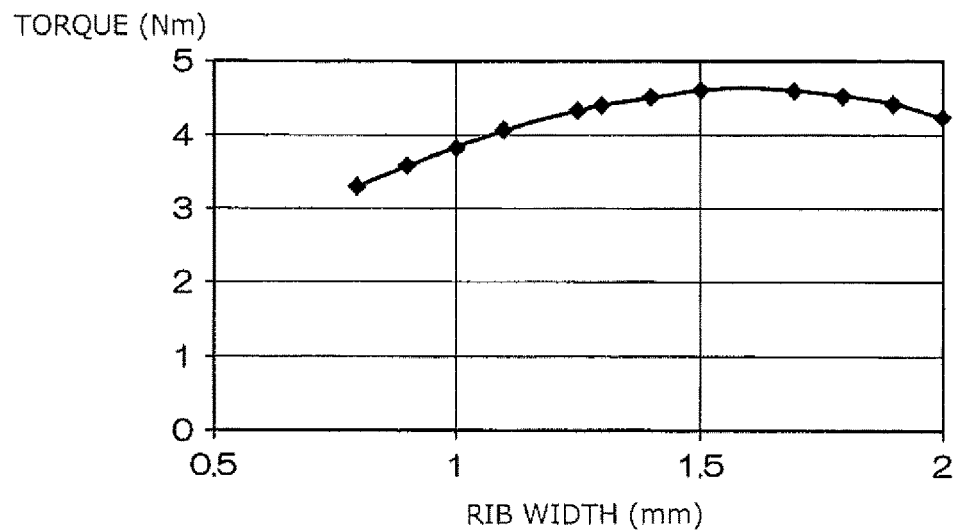
FIG. 5A is a graph showing the simulation results of output torque for various rib widths m in the case where the sum of the rib width m and the flux barrier width a is constant.
Figure 5B:
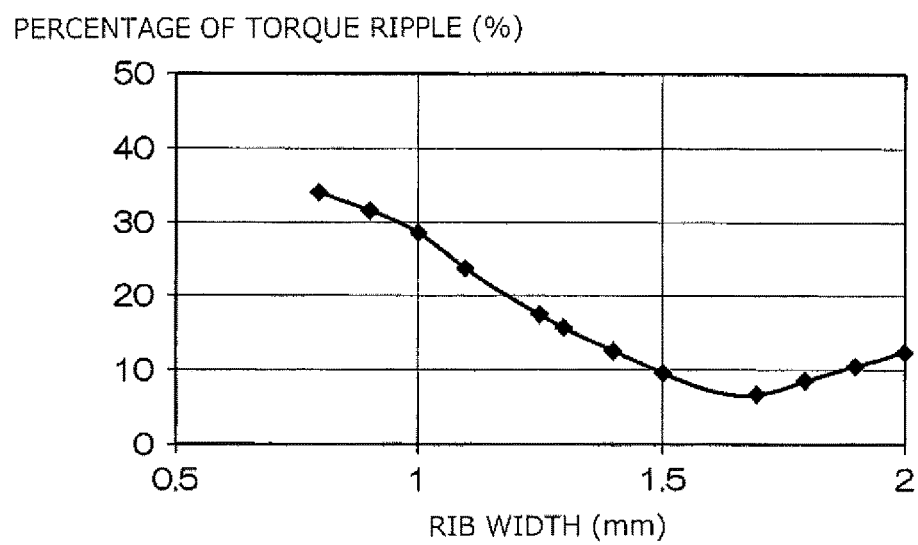
FIG. 5B is a graph showing the simulation results of torque ripple for various rib widths m in the case where the sum of the rib width m and the flux barrier width a is constant.

FIG. 5A is a graph showing the simulation results of the output torque for the various widths m of the rib 24 out of the simulation results shown in Table 1. FIG. 5B is a graph showing the simulation results of torque ripple for the various widths m of the rib 24 out of the simulation results shown in Table 1. As shown in Table 1 and FIG. 5A, the output torque is maximum when the width m of the rib 24 is 1.5 mm to 1.7 mm (the width a of the flux barrier 23 is 1.0 mm to 0.8 mm). That is, the output torque is maximum when the ratio m/a of the width m of the rib 24 to the width a of the flux barrier 23 is 1.50 to 2.11 When the width m of the rib 24 is in the range of 1.5 mm or less, the amount of magnetic flux flowing through the ribs 24 increases as the width m of the rib 24 increases. Accordingly, when the width m of the rib 24 is in this range, the output torque increases as the width m of the rib 24 increases. The width a of the flux barrier 23 decreases as the width m of the rib 24 increases. When the width m of the rib 24 is larger than 1.7 mm, the width a of the flux barrier 23 is too small. The amount of leakage magnetic flux in the q-axis direction increases accordingly. The output torque therefore decreases as the width m of the rib 24 becomes larger than 1.7 mm.

As shown in Table 1 and FIG. 5B, the torque ripple is minimum when the width m of the rib 24 is around 1.7 mm (the width a of the flux barrier 23 is around 0.8 mm). That is, the torque ripple is minimum when the ratio m/a of the width m of the rib 24 to the width a of the flux barrier 23 is around 2.13. Accordingly, in order to increase the output torque while reducing the torque ripple, the width m of the rib 24 is preferably 1.5 mm or more and 1.9 mm or less, and more preferably 1.6 mm or more and 1.8 mm or less. In other words, in order to increase the output torque while reducing the torque ripple, the ratio m/a is preferably 1.50 and more and 4.75 or less, and more preferably 1.78 or more and 3.00 or less.

Although the embodiment of the present invention is described above, the present invention may be carried out in other forms. For example, in the above embodiment, the rotor 20 has four poles (two pairs of poles). However, the number of poles of the rotor 20 may be other than four. For example, the rotor 20 may have six poles (three pairs of poles), eight poles (four pairs of poles), etc. In the above embodiment, the flux barriers 23 are arranged in seven layers. However the number of layers of the flux barriers 23 may be other than seven. For example, the flux barriers 23 may be arranged in five layers, six layers, eight layers, nine layers, etc.

The radius r of the rotor 20, the width c of the connection portion 25, the width m of the rib 24, the width a of the flux barrier 23, and the width b of the bridge 26 are not limited to the values shown in the above embodiment. The present invention is applicable, for example, to synchronous motors that are used for electric power steering systems. However, the present invention is also applicable to synchronous motors that are used for applications other than the electric power steering systems.

Various design modifications can be made within the scope of the claims.

What is claimed is:

1. A synchronous reluctance motor, comprising:
   a stator; and
   a rotor with a rotor core, the rotor having flux barrier groups formed at an interval in a circumferential direction, the number of flux barrier groups corresponding to the number of poles, and each of the flux barrier groups having a plurality of arc-shaped flux barriers that are arranged in a plurality of layers from an outer periphery of the rotor toward a center of the rotor and that are convex toward the center of the rotor, wherein
   a midpoint in the circumferential direction of each of the flux barrier groups, as viewed in plan in a direction along a rotary shaft of the rotor, is an intersection point of an outer peripheral edge of the rotor and an imaginary straight line extending in the radial direction of the rotor core through centers in the circumferential direction of the flux barriers of each flux barrier group,
   the plurality of flux barriers of each of the flux barrier groups include arc-shaped portions formed in a polygonal region that is surrounded by a polygon having vertices at the midpoints, and
   centers of curvature of arcs of the arc-shaped portions of each one of the flux barrier groups are located at the midpoint in the circumferential direction of each respective one of the flux barrier groups, the midpoint being located on the outer peripheral edge of the rotor.

2. The synchronous reluctance motor according to claim 1, wherein
   the plurality of flux barriers of each of the flux barrier groups are formed by the arc-shaped portions in the polygonal region and linear portions as viewed in the plan, the linear portions extending outside the polygonal region from both ends of each of the arc-shaped portions and each extending in a direction perpendicular to a side of the polygonal region.

3. The synchronous reluctance motor according to claim 1, wherein
    a ratio of a width of a rib to a width of the flux barrier is greater than or equal to 1.78 and less than or equal to 3.00, the rib being a region of the rotor interposed between adjoining ones of the flux barriers of the flux barrier group.

4. The synchronous reluctance motor according to claim 2, wherein
    a ratio of a width of a rib to a width of the flux barrier is greater than or equal to 1.78 and less than or equal to 3.00, the rib being a region of the rotor interposed between adjoining ones of the flux barriers of the flux barrier group.

\* \* \* \* \*